(12) United States Patent
Kirchner et al.

(10) Patent No.: US 9,846,025 B2
(45) Date of Patent: Dec. 19, 2017

(54) TRACK DATA DETERMINATION SYSTEM AND METHOD

(71) Applicant: Wabtec Holding Corp., Wilmerding, PA (US)

(72) Inventors: Michael Charles Kirchner, Marion, IA (US); Jeffrey D. Kernwein, Cedar Rapids, IA (US); Chad E. Diefenderfer, Iowa City, IA (US); Matthew T. Wall, Cedar Rapids, IA (US)

(73) Assignee: Wabtec Holding Corp., Wilmerding, PA (US)

( * ) Notice: Subject to any disclaimer, the term of this patent is extended or adjusted under 35 U.S.C. 154(b) by 545 days.

(21) Appl. No.: 13/723,378

(22) Filed: Dec. 21, 2012

(65) Prior Publication Data

US 2014/0176711 A1    Jun. 26, 2014

(51) Int. Cl.
| | | |
|---|---|---|
| H04N 5/225 | (2006.01) | |
| G01B 11/00 | (2006.01) | |
| G01S 19/50 | (2010.01) | |
| B61L 23/04 | (2006.01) | |
| B61L 25/02 | (2006.01) | |
| G01S 19/48 | (2010.01) | |
| G01S 19/49 | (2010.01) | |

(52) U.S. Cl.
CPC .......... *G01B 11/00* (2013.01); *B61L 23/041* (2013.01); *B61L 25/025* (2013.01); *G01S 19/50* (2013.01); *B61L 2205/04* (2013.01); *G01S 19/48* (2013.01); *G01S 19/49* (2013.01)

(58) Field of Classification Search
CPC ................................ H04N 5/225; G01B 11/00
USPC ........................................................ 348/148
See application file for complete search history.

(56) References Cited

U.S. PATENT DOCUMENTS

| | | |
|---|---|---|
| 3,562,419 A | 2/1971 | Stewart et al. |
| 4,915,504 A | 4/1990 | Thurston |
| 5,721,685 A | 2/1998 | Holland et al. |
| 6,356,299 B1 | 3/2002 | Trosino et al. |
| 6,526,352 B1 | 2/2003 | Breed et al. |

(Continued)

FOREIGN PATENT DOCUMENTS

| | | |
|---|---|---|
| WO | 2005119630 A1 | 12/2005 |
| WO | 2008120971 A1 | 10/2008 |

OTHER PUBLICATIONS

Precise Post-processing GPS Data: Products and Services from JPL: James F Zumberger and Frank H. Webb; JPL, California Institute of Technology; Jan. 2001.*

*Primary Examiner* — Jonathan Messmore
(74) *Attorney, Agent, or Firm* — The Webb Law Firm (57) ABSTRACT

A track data determination system including: a video camera device positioned on a vehicle to capture video data in at least one field-of-view; a geographic positioning unit associated with the vehicle to generate position data and time data; a recording device to store at least one of the following: at least a portion of the video data, at least a portion of the position data, at least a portion of the time data, or any combination thereof; and a controller to: (i) receive the video data, the position data, and/or the time data; and (ii) determine track data based at least in part upon the video data, the position data, and/or the time data. A computer-implemented track data determination method is also disclosed.

29 Claims, 2 Drawing Sheets

(56) References Cited

U.S. PATENT DOCUMENTS

| | | |
|---|---|---|
| 6,634,112 B2 | 10/2003 | Carr et al. |
| 6,681,160 B2 | 1/2004 | Bidaud |
| 6,909,514 B2 | 6/2005 | Nayebi |
| 7,050,926 B2 | 5/2006 | Theurer et al. |
| 7,164,975 B2 | 1/2007 | Bidaud |
| 7,395,140 B2 | 7/2008 | Christie et al. |
| 7,403,296 B2 | 7/2008 | Farritor et al. |
| 7,415,335 B2 | 8/2008 | Bell et al. |
| 7,440,634 B2 | 10/2008 | Ben-Ezra et al. |
| 7,463,348 B2 | 12/2008 | Chung |
| 7,542,831 B2 | 6/2009 | Christie et al. |
| 7,616,329 B2 | 11/2009 | Villar et al. |
| 7,659,972 B2 | 2/2010 | Magnus et al. |
| 7,755,660 B2 | 7/2010 | Nejikovsky et al. |
| 7,772,539 B2 | 8/2010 | Kumar |
| 8,345,948 B2 | 1/2013 | Zarembski et al. |
| 8,412,393 B2 | 4/2013 | Anderson et al. |
| 8,934,007 B2 | 1/2015 | Snead |
| 9,049,433 B1 | 6/2015 | Prince |
| 9,050,984 B2 | 6/2015 | Li et al. |
| 9,205,850 B2 | 12/2015 | Shimada et al. |
| 2002/0154213 A1 | 10/2002 | Sibyama et al. |
| 2003/0222981 A1 | 12/2003 | Kisak et al. |
| 2004/0095585 A1 | 5/2004 | Nayebi |
| 2007/0217670 A1* | 9/2007 | Bar-Am ............... 382/141 |
| 2009/0102638 A1 | 4/2009 | Olsen et al. |
| 2009/0196486 A1* | 8/2009 | Distante ............ G06T 7/0008 |
| | | 382/141 |
| 2009/0257620 A1* | 10/2009 | Hicks ............... G06Q 30/02 |
| | | 382/100 |
| 2009/0309976 A1 | 12/2009 | Kumar |
| 2010/0007551 A1 | 1/2010 | Pagliuco et al. |
| 2010/0026551 A1 | 2/2010 | Szwilski et al. |
| 2010/0063657 A1 | 3/2010 | Kumar |
| 2010/0070172 A1 | 3/2010 | Kumar |
| 2010/0131185 A1* | 5/2010 | Morris ............... B61L 3/065 |
| | | 701/19 |
| 2012/0158238 A1* | 6/2012 | Daley et al. ............ 701/29.1 |
| 2012/0300060 A1* | 11/2012 | Farritor ............... B61K 9/08 |
| | | 348/125 |
| 2013/0060520 A1* | 3/2013 | Amor et al. ............ 702/154 |
| 2013/0230212 A1 | 9/2013 | Landes et al. |
| 2014/0142868 A1* | 5/2014 | Bidaud ............ G01N 21/8803 |
| | | 702/40 |
| 2014/0152814 A1 | 6/2014 | Farritor |

* cited by examiner

TRACK DATA DETERMINATION SYSTEM AND METHOD

BACKGROUND OF THE INVENTION

Field of the Invention

The present invention relates generally to railroad data determination and control systems, e.g., Positive Train Control (PTC) systems, for use in connection with trains that traverse a complex track network, and in particular to a track data determination system and method for generating improved and accurate track and track feature location data for use in ongoing railway operations.

Description of the Related Art

As is known, railway systems and networks are in use in all areas of the world for use in both transporting people and goods to various locations and destinations. While the layout of the existing track network (and features associated therewith) in any particular area is generally known, new track installations, extensions of existing track, and modifications to the existing track network must be mapped and/or modeled. Such mapping and modeling is required in order to accurately determine the geographic position of the track and the features (e.g., a crossing, a wayside device, a signal, etc.) associated with any particular length of track. As expected, this accurate determination of the track position and associated features is an initial step for, in turn, accurately determining the position of any specified train or railway vehicle that is traversing this track.

Train control, e.g., Positive Train Control (PTC), comprises a system where certain trains include an on-board system (i.e., an on-board controller (OBC)) and operate in communication within a track communication network, normally controlled by a computer system located remotely at a central dispatch location. In the United States, the Federal Railroad Administration (FRA) has mandated that certain trains and/or railroad implement PTC by 2015, such that there exists over 100,000 miles of railroad track that will need to be surveyed and validated according to the FRA procedures. This amount of survey data will also need to be maintained and updated as new track is installed, or existing track (or associated features) is modified. Accordingly, the transition to PTC for Class 1 freight railroads includes the detailed mapping and/or modeling of track lines and track features.

This track data determination effort is a complex and costly technical and business undertaking. Existing systems for surveying and mapping track lines and track features are slow and expensive, which represent a hurdle to collecting Federally-mandated PTC track data. One known track data determination process includes moving a specially-equipped vehicle on a length of track that requires location and/or verification. This process requires coordination of track time with production operations, as well as knowledgeable personnel to operate the vehicle during this procedure. For example, this project may require 2 individuals to operate the vehicle and implement the process, with the result of 20 miles of track (and features) being mapped in an 8-hour day. Further, every time a change occurs on or near the track, this process must be repeated, as this procedure is not scalable.

Accordingly, there is a need in the art for an effective track data determination system and method that generates accurate and reliable data for mapping and/or modeling existing, new, and/or modified track (and associated features) in a complex track network.

SUMMARY OF THE INVENTION

Therefore, it is an object of the present invention to provide a track data determination system and method that address or overcome some or all of the various drawbacks and deficiencies present in existing railroad track systems and networks. Generally, provided is a track data determination system and method that generate accurate and useful data regarding the location of track and/or features associated with the track in a complex track network. Preferably, provided is a track data determination system and method that facilitate and support the general implementation of a computerized train control system on numerous trains navigating this complex track network. Preferably, provided is a track data determination system and method that are scalable and reliable for mapping and/or modeling the track infrastructure, with reduced or limited human involvement. Preferably, provided is a track data determination system and method that facilitate the verification of existing track data, which can be implemented on a periodic basis for continued verification.

Accordingly, and in one preferred and non-limiting embodiment, provided is a track data determination system for use in connection with at least one vehicle configured to traverse a track. This system includes: at least one video camera device positioned on a portion of the at least one vehicle and configured to capture video data in at least one field-of-view; at least one geographic positioning unit associated with the at least one vehicle and configured to generate position data and time data; at least one recording device configured to store at least one of the following: at least a portion of the video data, at least a portion of the position data, at least a portion of the time data, or any combination thereof; and at least one controller to: (i) receive at least one of the following: at least a portion of the video data, at least a portion of the position data, at least a portion of the time data, or any combination thereof; and (ii) determine track data based at least in part upon at least one of the following: at least a portion of the video data, at least a portion of the position data, at least a portion of the time data, or any combination thereof.

In another preferred and non-limiting embodiment, provided is a computer-implemented track data determination method. The method includes: capturing video data in at least one field-of-view by at least one video camera device positioned on a portion of at least one vehicle configured to traverse a track; generating position data and time data by at least one geographic positioning unit associated with the at least one vehicle; storing, by at least one recording device, at least one of the following: at least a portion of the video data, at least a portion of the position data, at least a portion of the time data, or any combination thereof; and determining track data based at least in part upon at least one of the following: at least a portion of the video data, at least a portion of the position data, at least a portion of the time data, or any combination thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE DRAWINGS

DETAILED DESCRIPTION OF THE PREFERRED EMBODIMENT(S)

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further, it is to be understood that the invention may assume various alternative variations and step sequences, except where expressly specified to the contrary.

Figure 1:
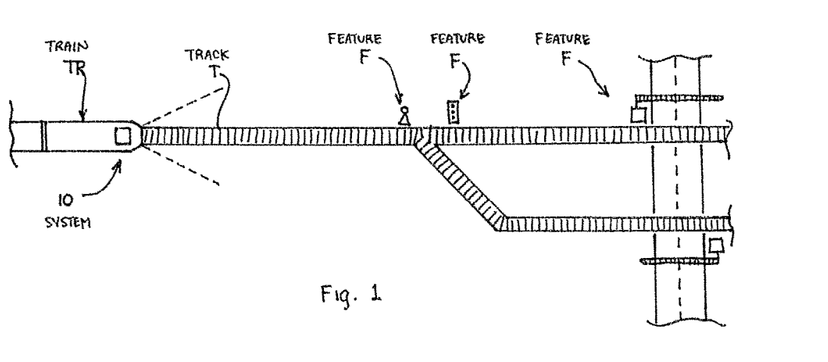
FIG. 1 is a schematic view of one embodiment of a track data determination system according to the principles of the present invention.

The present invention is directed to a track data determination system 10 and associated methods for use in connection with a complex track network. Accordingly, the system 10 and methods of the present invention are useful in connection with a wide variety of transit systems where the vehicles are traversing a track or line that extends over a distance. For example, as illustrated in FIG. 1, the system 10 is used in connection with a vehicle, in this case a train TR that traverses a track T. As further illustrated in FIG. 1, the track T has various features F associated with it, such as a mile marker, a bridge, a switch, a signal, a crossing, and the like. These features F are located near or otherwise associated with a specific length of track T.

Collectively, the track T that extends through and between various locations makes up the track network. As is known in the railroad industry, the existing track network is complex and constantly being modified and/or newly installed. Therefore, the presently-invented system 10 and methods are particularly useful in connection with the existing and expanding track network in this railway industry. However, the invention is not limited thereto, and is equally effective for use in connection with any track-based vehicle and network.

Further, it should be noted that various components of the system 10 are controlled by and/or in communication with one or more computing devices. Accordingly, as used hereinafter, the term "controller," "central controller," or "computer" refers to any computing device that is suitable to facilitate this automated control and communication by and between the various components and devices in the system 10.

Figure 2:
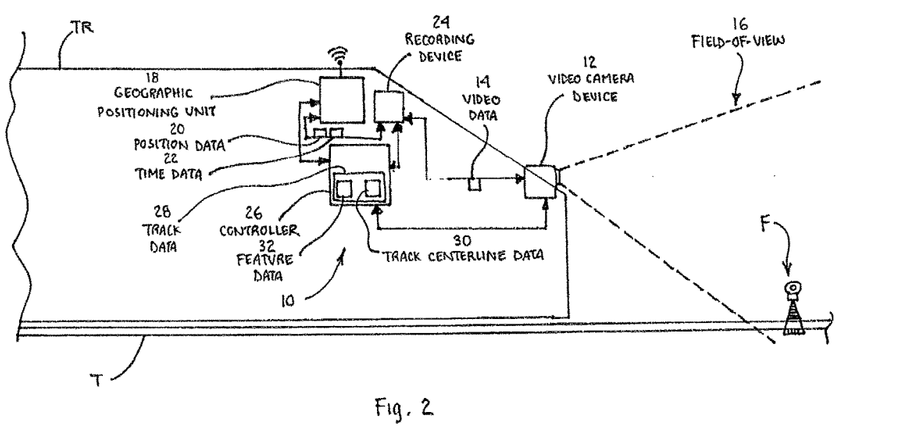
FIG. 2 is a schematic view of another embodiment of a track data determination system according to the principles of the present invention.

One preferred and non-limiting embodiment of the track data determination system 10 is illustrated in schematic form in FIG. 2. In particular, this embodiment of the system 10 of the present invention includes at least one video camera device 12 that is positioned on or otherwise associated with a portion of the train TR, such as a locomotive L. This video camera device 12 is programmed, configured, or adapted to capture video data 14 in at least one field-of-view 16. This video data 14 may be in the form of a digital signal, an analog signal, an optical signal, or any other suitable information signal that can carry or provide data regarding at least the field-of-view 16. Further, the video camera device 12 can be any suitable unit, such as a high-resolution or high-definition digital video camera.

The system 10 further includes a geographic positioning unit 18, which, like the video camera device 12, in this embodiment, is positioned on or associated with the train TR. The geographic positioning unit 18 is programmed, configured, or adapted to generate position data 20 and time data 22. In particular, the position data 20 includes information about the position of the geographic positioning unit 18, namely the receiver of this unit 18. Similarly, the time data 22 includes information relating to the time that the position data 20 was transmitted, received, and/or processed by the geographic positioning unit 18.

With continued reference to FIG. 2, the system includes at least one recording device 24, which is programmed, configured, or adapted to store at least a portion of the video data 14, at least a portion of the position data 20, and/or at least a portion of the time data 22. Accordingly, this recording device 24 acts as the central repository for the data streams that are being collected to by the video camera device 12 and/or the geographic positioning unit 18. Further, it is envisioned that this recording device 24 may receive inputs from other local components on the train TR, such as the onboard controller (OBC), as well as remote data feeds from other devices on the train TR or remotely positioned from the train TR, such as central dispatch or the like.

In this embodiment, the system 10 also includes at least one controller 26. This controller 26 may be separate from or integrated with the existing OBC of the train TR. In addition, this controller 26 also refers to multiple controllers or computers remote from each other. Accordingly, the various data processing steps can be performed on one or more controllers, computers, computing devices, and the like, which may be on the train TR, integrated with the train TR OBC, and/or remote from the train TR (such as at central dispatch or other railway office). Regardless, this controller 26 is programmed, configured, or adapted to receive at least a portion of the video data 14, at least a portion of the position data 20, and/or at least a portion of the time data 22. Accordingly, this information and data can be received directly or indirectly from the recording device 24, or directly or indirectly from the video camera device 12 and the geographic positioning unit 18. In addition, the controller 26 determines track data 28 based at least partially on at least a portion of the video data 14, at least a portion of the position data 20, and/or at least a portion of the time data 22.

Further, while this track data 28 can include any information regarding the track T, the features F, and/or the train TR, in one preferred and non-limiting embodiment, the track data 28 includes track centerline data 30, feature data 32, and/or verification data 34. The track centerline data 30 includes at least data or information sufficient to determine the centerline C (i.e., the center between the rails along a section of track T) of the track T upon which the train TR is traversing. The feature data 32 includes data and information about the feature F, such as its location with respect to the train TR, its location with respect to the tracks T, or any other information about the specific feature F. Further, the verification data 34 includes data and information that allows for the verification of existing track data 28, such that this existing information can be verified or otherwise analyzed.

In another preferred and non-limiting embodiment, the controller 26 is programmed, configured, or adapted to synchronize at least a portion of the video data 14 with at least a portion of the position data 20. In particular, this synchronization process is implemented using the time data 22 from the geographic positioning unit 18. Further, this synchronization facilitates the accurate location of the centerline C of the track T and/or the location or position of the feature F in the field-of-view 16. In addition, the controller 26 is programmed, configured, or adapted to correlate positions between at least one component of the video camera device 12, at least one component of the geographic positioning unit 18, at least a portion of the train TR, at least a portion of the track T, or any combination of these components or positions. Specifically, and whether predetermined, manually-determined, or dynamically-determined, the relative positioning between the video camera device 12, the geographic positioning unit 18, the train TR, and/or the track T occurs in order to accurately place the train TR, the track T, the centerline C of the track T, and/or the feature F in the field-of-view 16. As discussed, the positions of these components and locations are provided or determined to ensure appropriate synchronization, correlation, and accuracy in the system 10.

In another preferred and non-limiting embodiment, and prior to determining the track data 28, the controller 26 can be programmed, configured, or adapted to receive camera calibration data 36. It is also envisioned that the controller 26 can create or generate this camera calibration data 36. Further, the camera calibration data 36 includes, but is not limited to, focal length, lens distortion, pose, measured data, position data, orientation data, viewpoint data, and/or camera data. In particular, this camera calibration data 36 includes data and information sufficient to correlate and/or translate the incoming information from the field-of-view 16 and the video data 14 with the other incoming data streams to the controller 26. In essence, the conditions, physical location, and operating components of the video camera device 12 should be accurately understood or determined in order to ensure that the track data 28, such as the feature data 32, and the track centerline data 30, are as accurate and realistic as possible. In addition, the camera calibration data 36 is important in order to make further determinations and correlations between the train TR, the track T, and the features F. For example, the camera calibration data 36 may include camera data relating to the position and/or the orientation of the video camera device 12, such as the mounting position on the train TR. Again, all of this camera calibration data is used to provide accuracy in the determined track data 28.

In another preferred and non-limiting embodiment, the geographic positioning unit 18 is in the form of a Global Positioning System (GPS) device, which is in communication with at least one GPS satellite and represents a space-based global navigation satellite system that provides reliable location and time information anywhere on or near the Earth when there is a substantially unobstructed line of sight to 4 or more satellites. In this embodiment, at least a portion of the position data 20 is in the form of raw GPS data 38. Further, the controller 26 is configured to receive and/or process at least a portion of this raw GPS data 38 by applying one or more processing routines 40. These processing routines 40 can take a variety of forms, and may take into account pseudo-range data, satellite data, ephemeris data, clock data, ionosphere data, correction data, third-party data, and/or reference data. Once processed, corrected GPS data 41 is determined and/or provided for further use in one or more processing routines of the system 10 for determining the track centerline data 30, feature data 32, and/or other intermediate or final data points or streams.

In another preferred and non-limiting embodiment, the processing routine 40 takes the form of a Precise Point Positioning (PPP) technique or process. Such a technique provides an automated program that takes into account one or more of the above-listed features and conditions. For example, certain network data, estimates of GPS clocks, GPS orbits, satellite orbits, and various latencies and accuracy conditions can be used to process the raw GPS data 38, as obtained from the geographic positioning unit 18. Further, the Precise Point Positioning technique and system provides for the precise analysis of raw GPS data 38, for example, dual-frequency GPS data from stationary receivers, and obviates a need for a user to learn the specific details of all GPS processing software. This Precise Point Positioning technique is discussed in the reference: *Precise Post-processing of GPS Data: Products and Services from JPL*; James F. Zumberger and Frank H. Webb; Jet Propulsion Laboratory, California Institute of Technology; January 2001, the contents of which are incorporated herein by reference.

In another preferred and non-limiting embodiment, the processing routine 40 includes the following steps: (1) calibrate the video camera device 12; (2) initialize or begin the synchronization routine for the incoming data streams (e.g., video data 14, position data 20, track data 28, feature data 32, and the like) based at least partially upon time data 22; (3) collect/process the video data 14 on a frame-by-frame basis; (4) collect/process position data 20 at a rapid rate; (5) associate and record time data 22 and position data 20 with video data 14 (preferably on a per-frame basis); and (6) determine whether the processing routine 40 is complete.

In another preferred and non-limiting embodiment, the processing routine 40 includes the following steps: (1) access or obtain the recorded data; (2) extract the raw GPS data 38; (3) submit or transmit the raw GPS data 38 to a remote correction service (e.g., a remotely-operated PPP technique or process) for creation and/or determination of the corrected GPS data 41; (4) receive corrected GPS data 41; (5) import the corrected GPS data 41 into one or more databases; and (6) store and associate the raw GPS data 38 and the corrected GPS data 41 for use in further processing, such as video data 14/position data 20/time data 22 matching (e.g., frame-by-frame matching and/or association, as discussed above). Again, this processing technique (i.e., processing the raw GPS data 38 into corrected GPS data 41) may be in the form of computer program stored locally on the controller 26, on the OBC of the train TR, at central dispatch, at a third-party server, or in any other accessible computing device, server, and the like.

Figure 3:
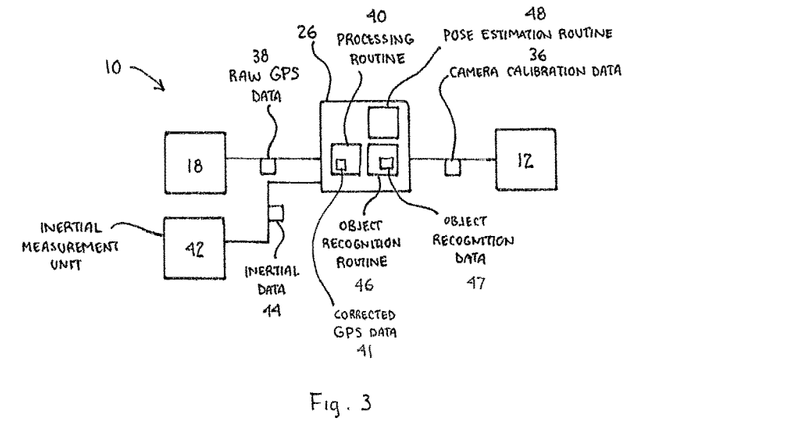
FIG. 3 is a schematic view of a further embodiment of a track data determination system according to the principles of the present invention.

In a still further preferred and non-limiting embodiment, and as illustrated in FIG. 3, the track data determination system 10 includes at least one inertial measurement unit 42 positioned on a portion of the train TR. This inertial measurement unit 42 is used to generate inertial data 44 that can be used to provide additional position data 20 (or otherwise augment this data 20). This inertial measurement unit 42 may be in the form of one or more sensors, such as an accelerometer, a gyroscope, a magnetometer, a pressure sensor, or the like.

Accordingly, at least a portion of the inertial data 44 can be used in providing more accurate track data 28, or providing data in GPS-denied or -limited environments. Specifically, the controller 26 is further programmed, configured, or adapted to process at least a portion of the position data 20 by applying at least one processing routine 40 based on or including some or all of the inertial data 44. Still further, the processing routine 40 may utilize or otherwise include a Kalman filter to provide additional accuracy in the determinations. Such a Kalman filter is a mathematical method that uses the inertial data 44 (which contains noise and other random variations/inaccuracies) and generates values that tend to be closer to the true values of the measurements and their associated calculated values.

In a still further preferred and non-limiting embodiment, the controller 26 is programmed, configured, or adapted to determine camera calibration data 36 including the position of the video camera device 12 (on the train TR) and the orientation of the video camera device 12 (which provides the field-of-view 16). Further, based at least partially on the time data 22, the controller 26 is programmed, configured, or adapted to correlate at least a portion of the position data 20 and at least a portion of the camera calibration data 36. Accordingly, the system 10 of the present invention provides the correlation between position data 20 and camera calibration data 36 for use in providing the track data 28 and/or improving the existing track data 28. In addition, in this embodiment, the track data 28 may be in the form of track centerline data 30.

In a further preferred and non-limiting embodiment, the controller 26 is programmed, configured, or adapted to determine feature data 32 (as part of the track data 28). Specifically, at least a portion of the feature data 32 is determined by applying at least one object recognition routine 46 to at least a portion of the video data 14, thereby utilizing and/or obtaining object recognition data 47. See FIG. 3. In addition, or in the alternative, at least a portion of the feature data 32 is determined by applying at least one pose estimation routine 48 to at least a portion of the video data 14. In particular, and in one preferred and non-limiting embodiment, the pose estimation routine 48 includes the following processing steps: (1) identifying at least one point on a surface of at least one feature F (e.g., a mile post, a bridge, a switch, a signal, a piece of equipment at a crossing, or the like); (2) receiving dimension data directed to or associated with the feature F; (3) determining the relative position of the feature F with respect to the video camera device 12; and (4) determining the global position of the feature F. Accordingly, this process allows for the determination of the global position of a feature F along a track T (or in the track network) using object recognition techniques. It is recognized that the dimension data of the feature F, such as height, width, depth, shape, etc., may be predetermined, manually entered, automatically recognized, or otherwise dynamically generated during the process. Since many of the features F and associated equipment have known dimensions, this information and data can be used in the pose estimation routine 48 to determine the global position of the feature F.

In another preferred and non-limiting embodiment, the track data 28 can be determined by processing the video data 14 (such as one or more frames of the video) to determined the location of the image of the rails of the track T. Since the rails are a standard length apart, the distance in front of the video camera device 12 can be determined by the pixel width of the track T at a certain point. The centerline C of the track T can be constructed between the track T and the lateral distance to the feature F to the side of the rail by determining the pixel width at the area perpendicular to the track T. Similar such pixel-based and other video analytic processes could be used to determine track data T, such as feature data 32.

Figure 4:
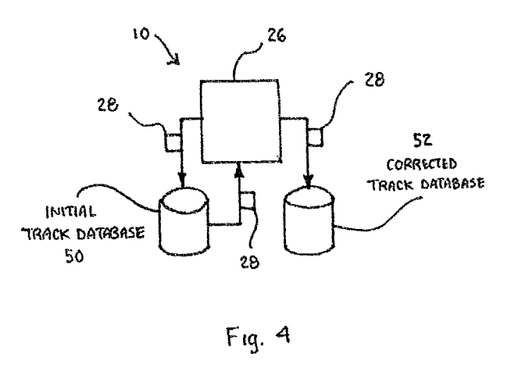
FIG. 4 is a schematic view of a still further embodiment of a track data determination system according to the principles of the present invention.

In another preferred and non-limiting embodiment, and as illustrated in FIG. 4, the track data determination system 10 may facilitate the generation of an initial track database 50. Accordingly, this initial track database 50 is populated with information, i.e., track data 38, that is accurate, as based upon the above-described processing steps. It is further recognized that this initial track database 50 can be built and/or generated by the controller 26, as located on the train TR, by the controller 26, as located remotely from the train TR, and/or by some other controller or computing device, such as an offline computing system or a network system in communication with central dispatch or other central data depository.

In a further preferred and non-limiting embodiment, and with continued reference to FIG. 4, once populated with track data 28, the initial track database 50 becomes the operational database that is used by central dispatch and provided to or used in connection with the onboard controller for operation of the train TR. Further, and after such implementation and use, the initial track database 50 is considered the existing track database for use in operations in the track network. Therefore, and in another preferred and non-limiting embodiment, the controller 26 (whether local to the train TR or remote therefrom) is programmed, configured, or adapted to receive track data 28 from an existing track database (e.g., the initial track database 50). Next, the controller 26 compares at least a portion of the track data 28 from the existing track database to at least a portion of the determined track data 28 produced by the above-discussed processing steps and routines. Based at least partially upon this comparison, a corrected track database 52 is built or generated. Accordingly, the presently-invented system 10 can be used to not only establish the initial track database 50, but can also be used as a verification tool and/or a corrective process to provide improved track data 28. Additionally, such improved track data 28 and/or a corrected track database 52 leads to an overall improved operational process of the trains TR on the tracks T in the track network.

Figure 5:
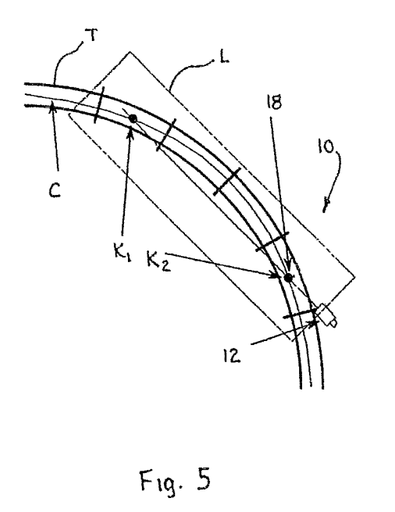
FIG. 5 is a schematic view of another embodiment of a track data determination system according to the principles of the present invention.

With reference to FIG. 5, and in a further preferred and non-limiting embodiment, the train TR includes at least one locomotive L, which includes at least one, and typically two, wheel assembly kingpins $K_1$ and $K_2$. These wheel assembly kingpins $K_1$ and $K_2$ represent the pivot point on which a truck swivels, and are also known as the center pins. In this embodiment, a component of the geographic positioning unit 18 is mounted substantially directly over at least one of the wheel assembly kingpins K. In particular, it is preferable that the antenna of the geographic positioning unit 18, e.g., a GPS unit, is located above the front or forward wheel assembly kingpin $K_2$. This positioning is particularly beneficial since the kingpins $K_1$ and $K_2$ are continually positioned over the centerline C of the track T. Therefore, the position information received and/or generated by the geographic positioning unit 18 (as position data 20) is more accurate and reflective of the centerline C, i.e., track centerline data 30.

In addition, as further illustrated in FIG. 5, in another preferred and non-limiting embodiment, the video camera device 12 is mounted on or near the front of the locomotive L and substantially in line with the wheel assembly kingpins $K_1$ and $K_2$. As with the geographic positioning unit 18, this preferential mounting of the video camera device 12 to the front of a locomotive L optimizes the field-of-view 16 and leads to more accurate track data 28. However, it is recognized that when the locomotive L is traversing a bend in the track T, the video camera device 12, as mounted to the front of the locomotive L, is now pointing away from and/or is offset from the centerline C of the track T. However, as discussed above, the appropriate processing routines 40, together with the above-discussed pose estimation routine 48, takes this in to account. Therefore, the presently-invented system 10 provides for accurate and improved track data 28 for population in the initial track database 50 and/or corrected track database 52.

Example

In one exemplary embodiment of the presently-invented system 10, and with specific respect to calibration, manual measurements are made to correlate the positions of the geographic positioning unit 18 (e.g., the antenna of the unit), the video camera device 12, and the track T to each other for later processing. The height of the antenna from the track T may be important to tracking the centerline C. Further, the position difference between the antenna (or some of component of the geographic positioning unit 18) and the video camera device 12 can be used for correlating the position of the observed track features F (or centerline C) to the recorded position data 20. It is also useful to measure the distance between the wheel assembly kingpins $K_1$ and $K_2$ of the front and rear wheel assembly to compensate for the fact that the video camera device 12 will not be positioned over the centerline C of a curved track T (as discussed above).

Further, and as discussed, the video camera device 12 should be calibrated to account for at least the focal length and lens distortion. In this exemplary embodiment, this can be achieved by observing a test pattern with the video camera device 12 and using video analytic software to calculate a camera profile. Test pattern observation can be done in the field, pre-mission, or post-mission. In addition, the pose of the video camera device 12 can be hand measured. However, in this instance, it may provide some uncertainties from which point on the video camera device 12 to measure to get correlation between the video and real-life measurements. Therefore, and alternatively, the position and orientation of the video camera device 12 can be calculated by observing a track T. In particular, and since tracks T are parallel lines of known distance apart, the viewpoint or field-of-view 16 of the video camera device 12 can be extrapolated from the track video.

The position difference between the antenna (of the geographic positioning unit 18) and the video camera device 12 may be also difficult to measure. One alternative would be to observe a marker with the video camera device 12 and measure the position difference between the antenna and the marker. The relative position of the marker to the video camera device 12 can then be extrapolated with video analytics, and compared to the relative position of the marker to the antenna.

In this example, and after mounting, the antenna of the geographic positioning unit 18 should remain substantially stationary for 10-15 minutes in order to establish a high-accuracy baseline. This calibration should be repeated if the antenna loses connection with the satellites. It is recognized that the use of a dual-frequency GPS receiver would require significantly less calibration time. Such a dual-frequency GPS receiver can generate measurements on both L-band frequencies, where these dual-frequency measurements are useful for high precision (pseudo-range-based) navigation, since the ionospheric delay can be determined, and the data corrected for it. This pseudo-range-based navigation includes distance measurements based on the correlation of a satellite's transmitted code and the local receiver's reference code, which has not been corrected for errors in synchronization between the transmitter's clock and the receiver's clock.

Continuing with this example, and with reference to recording, once calibration is complete the track T "run" can be performed. The locomotive L is driven across the selected section or portion of track T while position data 20 is obtained by the geographic positioning unit 18 and video data 14 is obtained from the video camera device 12. In this example, the recording device 24 is a digital video recorder (DVR), which records information in a digital format on a mass storage device, such as the video data 14, while a separate device may be used to log the raw GPS data 38 from the geographic positioning unit 18. Of course, these may be the same recording devices 24. Still further, it is envisioned that this "run" may be the locomotive L operating for the specific purpose of collecting information and data, or alternatively, may be the train TR operating in its normal course of business and transit.

In order for frames from the track video (video data 14) to correspond with GPS positions (position data 20), they should be synchronized. In this example, this is achieved by time-stamping the video data 14 and the position data 20. As is known, and when using a GPS, position data 20 is time-stamped by the geographic positioning unit 18 based upon data from the GPS satellite signals. Further, the video data 14 is time-stamped by the recording device 24. Thereafter, the recording device 24 receives time information from the geographic positioning unit 18, such that the time-stamps of the position data 20 and video data 14 are in complete and accurate alignment and synchronization.

In the present example, and with reference to the processing functions, the raw GPS data 38 is obtained from the recording device 24 (or data logger), and this collection may occur during the mission or post-mission. Next, and as discussed above, post-processing routines are implemented using, in this example, Continuously Operating Reference Station (CORS) data downloaded from the Nation Geodetic Survey (NGS) to correct the raw GPS data 38 and obtain the corrected GPS data 41. The use of the processing routines 14 (e.g., processing routine 40) and CORS data eliminates much of the noise and inaccuracy of the field-collected data. This is based upon the integrity of the data of CORS, which is highly-accurate pseudo range data, with satellite ephemeris information (e.g., values from which a satellite's position and velocity at any instance in time can be obtained), clock correction data, and ionosphere correction data (data regarding the interference and variations caused by the ionosphere band in the atmosphere). The correction process (or processing routine 40) used in this example is the above-discussed Precise Point Positioning technique.

It is recognized that the accuracy of the position data 20 depends upon the number of satellites the geographic positioning unit 18 connects to during the collection process, the distance of the selected CORS to the geographic positioning unit 18, and the amount of time spent stationary for initialization. In this example, additional accuracy can be obtained by collecting and processing inertial data 44 from one or more inertial measurement units 42 on the train TR, which is especially useful in areas where satellite signals are absent, weak, or easily lost. In this instance, the accurate position data 20 can then be averaged with the above-discussed Kalman filter (or some similar process) to obtain a smooth and accurate track centerline data 30 and/or other track data 28.

Continuing with the example, once the track centerline data 30 is calculated, the difference in geographic positioning unit 18 (or antenna) position and video camera device 12 position can be applied to determine the position and orientation of the video camera device 12 in relation to the centerline C. Since the video data 14 and position data 20 are synchronized to the same clock, the time-stamp of any frame of video can be used to determine the global position and orientation of the video camera device 12 during that frame.

As discussed above, the presently-invented system 10 can be used in connection with any track T or features F. For example, such features F may include switches, signals, crossings, mile markers, bridges, and the like. As is known, and in order to produce effective and useful PTC track data 28, such features F should be identified. In this example, they may either be identified visually by a person manually analyzing the video data 14, or alternatively, using object recognition techniques that automatically detect these features F. As discussed above, the processing routines 40, 46 and/or 48 may be programmed, configured, or adapted to understand what different features F look like, and thereby, automatically identify them in the video data 14.

As also discussed above, and in this example, a pose estimation routine 48 may be implemented, which represents the process of determining the location of an object viewed by a camera relative to the camera. Accordingly, the pose estimation routine 48 can be utilized in connection with the video data 14 by identifying points on the surface of the feature F and processing those against known dimensions of the feature F. For example, knowing a mile marker is exactly a meter in height, the position of the mile marker relative to the video camera device 12 can be calculated. Once the position relative to the video camera device 12 is known, this can be processed against the adjusted or post-processed GPS data to give the global position of the track feature F.

Still further, and as discussed, the presently-invented system 10 is useful not only for the initial mapping of a track T and features F, but in connection with validating previously-mapped track T and features F. Using the reverse pose estimation routine 48 or process, the known position of features F can be highlighted on the track video. The highlights can be analyzed (automatically or manually) to confirm the presence of these features F and the accuracy of the position data 20.

In this manner, the presently-invented system 10 and methods generate accurate and useful track data 28 regarding the location of the track T (including the centerline C), as well as features F associated with the track T, in a complex track network. In addition, the track data determination system 10 and methods facilitate and support the general implementation of a Positive Train Control system. Still further, the system 10 and methods are scalable and reliable for mapping and/or modeling the track infrastructure, with reduced or eliminated human involvement. Still further, the track data determination system 10 and methods facilitate the verification of existing track data 38, which can be implemented on a periodic basis for continued verification.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A track data determination system for use in connection with at least one vehicle configured to traverse a track, the system comprising:
    at least one video camera device positioned on a portion of the at least one vehicle and configured to capture video data in at least one field-of-view forward of the at least one vehicle;
    at least one geographic positioning unit associated with the at least one vehicle and configured to generate position data and time data;
    at least one recording device configured to store at least one of the following: at least a portion of the video data, at least a portion of the position data, at least a portion of the time data, or any combination thereof; and
    at least one controller configured to:
        (i) receive at least one of the following: at least a portion of the video data, at least a portion of the position data, at least a portion of the time data, or any combination thereof; and
        (ii) determine track data based at least in part upon at least one of the following: at least a portion of the video data, at least a portion of the position data, at least a portion of the time data, or any combination thereof,
    wherein the track data comprises at least one of the following: track centerline data, feature data, verification data, or any combination thereof,
    wherein the track data comprises the track centerline data,
    wherein the track centerline data comprises data sufficient to define a centerline between rails of the track along a section of the track,
    wherein the track centerline data is used to determine a position and orientation of the at least one camera device to the centerline of the track, and
    wherein the at least one controller is further configured to:
    identify at least one point on a surface of at least one feature located outside of the rails and in the field of view forward of the at least one vehicle;
    receive dimension data including known physical dimensions of the at least one feature;
    determine the relative position of the at least one feature with respect to the at least one video camera device and the centerline of the track by processing the at least one point on the surface of the at least one feature against the known dimensions of the at least one feature and the track centerline data; and
    determine the global position of the at least one feature by processing the relative position of the at least one feature with respect to the at least one video camera device and the centerline of the track against the at least a portion of the position data.

2. The track data determination system of claim 1, wherein the at least one controller is further configured to synchronize at least a portion of the video data with at least a portion of the position data based at least partially on at least a portion of the time data.

3. The track data determination system of claim 1, wherein, prior to the determination step (ii), the controller is configured to receive camera calibration data, and wherein the camera calibration data includes at least one of the following: focal length, lens distortion, pose, measured data, position data, orientation data, viewpoint data, camera data, or any combination thereof.

4. The track data determination system of claim 1, wherein the at least one geographic positioning unit is a Global Positioning System device in communication with at least one Global Positioning System satellite, and wherein the position data comprises raw Global Positioning System data.

5. The track data determination system of claim 4, wherein the at least one controller is further configured to process at least a portion of the raw Global Positioning System data by applying at least one processing routine based at least partially on at least one of the following: pseudo-range data, satellite data, ephemeris data, clock data, ionosphere data, correction data, third-party data, reference data, or any combination thereof.

6. The track data determination system of claim 5, wherein the at least one processing routine comprises a Precise Point Positioning technique.

7. The track data determination system of claim 1, further comprising at least one inertial measurement unit positioned on a portion of the vehicle and configured to generate inertial data.

8. The track data determination system of claim 7, wherein the at least one controller is further configured to process at least a portion of the position data by applying at least one processing routine based at least partially on the inertial data.

9. The track data determination system of claim 8, wherein the at least one processing routine comprises a Kalman filter.

10. The track data determination system of claim 1, wherein the at least one controller is further configured to:
  determine camera calibration data comprising at least one of the position of the at least one video camera device and the orientation of the at least one video camera device; and
  based at least partially on the time data, correlate at least a portion of the position data and at least a portion of the camera calibration data.

11. The track data determination system of claim 1, wherein the at least one controller is further configured to determine feature data.

12. The track data determination system of claim 11, wherein at least a portion of the feature data is determined by applying at least one object recognition routine to at least a portion of the video data.

13. The track determination system of claim 11, wherein at least a portion of the feature data is determined by applying at least one pose estimation routine to at least a portion of the video data.

14. The track data determination system of claim 1, wherein at least one component of the at least one video camera device is mounted to a front of the at least one locomotive that is spaced apart from a roof of the at least one locomotive and substantially in line with the centerline of the track and a forward wheel assembly kingpin.

15. A computer-implemented track data determination method, comprising:
  capturing video data in at least one field-of-view forward of the at least one vehicle by at least one video camera device positioned on a portion of at least one vehicle configured to traverse a track;
  generating position data and time data by at least one geographic positioning unit associated with the at least one vehicle;
  storing, by at least one recording device, at least one of the following: at least a portion of the video data, at least a portion of the position data, at least a portion of the time data, or any combination thereof; and
  determining track data based at least in part upon at least one of the following: at least a portion of the video data, at least a portion of the position data, at least a portion of the time data, or any combination thereof,
  wherein the track data comprises at least one of the following: track centerline data, feature data, verification data, or any combination thereof,
  wherein the track data comprises the track centerline data,
  wherein the track centerline data comprises data sufficient to define a centerline between rails of the track along a section of the track,
  wherein the track centerline data is used to determine a position and orientation of the at least one video camera device to the centerline of the track, and
  wherein the method further comprises:
  identifying at least one point on a surface of at least one feature located outside of the rails and in the field of view forward of the at least one vehicle;
  receiving dimension data including known physical dimensions of the at least one feature;
  determining the relative position of the at least one feature with respect to the at least one video camera device and the centerline of the track by processing the at least one point on the surface of the at least one feature against the known dimensions of the at least one feature and the track centerline data; and
  determining the global position of the at least one feature by processing the relative position of the at least one feature with respect to the at least one video camera device and the centerline of the track against the at least a portion of the position data.

16. The track data determination method of claim 15, further comprising synchronizing at least a portion of the video data with at least a portion of the position data based at least partially on at least a portion of the time data.

17. The track data determination method of claim 15, wherein, prior to the determination step, the method further comprises generating camera calibration data, and wherein the camera calibration data includes at least one of the following: focal length, lens distortion, pose, measured data, position data, orientation data, viewpoint data, camera data, or any combination thereof.

18. The track data determination method of claim 15, further comprising applying, to at least a portion of the position data, at least one processing routine based at least partially on at least one of the following: pseudo-range data, satellite data, ephemeris data, clock data, ionosphere data, correction data, third-party data, reference data, or any combination thereof.

19. The track data determination method of claim 18, wherein the at least one processing routine comprises a Precise Point Positioning technique.

20. The track data determination method of claim 15, further comprising:
  generating inertial data by at least one inertial measurement unit positioned on a portion of the vehicle; and applying, to at least a portion of the position data, at least one processing routine based at least partially on the inertial data.

21. The track data determination method of claim 20, wherein the at least one processing routine comprises a Kalman filter.

22. The track data determination method of claim 15, further comprising:
   determining camera calibration data comprising at least one of the position of the at least one video camera device and the orientation of the at least one video camera device; and
   based at least partially on the time data, correlating at least a portion of the position data and at least a portion of the camera data.

23. The track data determination method of claim 15, further comprising determining feature data by at least one of the following:
   applying at least one object recognition routine to at least a portion of the video data; and
   applying at least one pose estimation routine to at least a portion of the video data.

24. The track data determination method of claim 15, further comprising building an initial track database based at least partially on at least a portion of the track data.

25. The track data determination method of claim 15, further comprising:
   receiving track data from an existing track database;
   comparing at least a portion of the track data from the existing track database to at least a portion of the determined track data; and
   based at least partially on the comparison, building a corrected track database.

26. The track data determination system of claim 15, the method further comprising mounting at least one component of the at least one video camera device to a front of the at least one locomotive that is spaced apart from a roof of the at least one locomotive and substantially in line with the centerline of the track and a forward wheel assembly kingpin.

27. The track data determination system of claim 1, wherein the relative position of the at least one feature with respect to the at least one video camera device is determined based on a known standard width of the rails of the track and a pixel width of the track in the video data.

28. The track data determination system of claim 27, further comprising determining a lateral distance to the at least one feature from the centerline of the track based on a pixel width from the centerline of the track to the at least one feature in the video data at an area perpendicular to the track.

29. The track data determination system of claim 1, wherein the at least a portion of the track data including the track centerline data is used to build an initial track database, and wherein the at least one controller is configured to: (i) receive track data including track centerline data from the initial track database; (ii) determine track centerline data based on the position data generated by the at least one geographic positioning unit; (iii) determine the position and orientation of the at least one camera device to the centerline of the track based on a difference between a position of the at least one geographic positioning unit and a position of the at least one camera device and the determined track centerline data; (iv) compare at least a portion of the track data including the track centerline data from the initial track database to at least a portion of the determined track centerline data; (v) based at least partially on the comparison, generate improved track data; and (vi) populate the initial track database with the improved track data.

* * * * *

UNITED STATES PATENT AND TRADEMARK OFFICE
CERTIFICATE OF CORRECTION

PATENT NO. : 9,846,025 B2
APPLICATION NO. : 13/723378
DATED : December 19, 2017
INVENTOR(S) : Michael Charles Kirchner et al.

Page 1 of 1

It is certified that error appears in the above-identified patent and that said Letters Patent is hereby corrected as shown below:

In the Claims

Column 13, Line 54, Claim 13, after "track" insert -- data --

Column 15, Line 34, Claim 26, delete "system" and insert -- method --

Signed and Sealed this
Tenth Day of April, 2018

Andrei Iancu
*Director of the United States Patent and Trademark Office*